(12) United States Patent
Onoue et al.

(10) Patent No.: US 8,514,345 B2
(45) Date of Patent: Aug. 20, 2013

(54) BACKLIGHT UNIT AND LIQUID CRYSTAL DISPLAY DEVICE

(75) Inventors: Masato Onoue, Osaka (JP); Shinji Suminoe, Osaka (JP); Koji Sakai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 155 days.

(21) Appl. No.: 13/111,262

(22) Filed: May 19, 2011

(65) Prior Publication Data

US 2011/0285937 A1 Nov. 24, 2011

(30) Foreign Application Priority Data

May 20, 2010 (JP) ................................. 2010-116205

(51) Int. Cl.
*G02F 1/1333* (2006.01)
*G02F 1/1335* (2006.01)
*F21V 7/04* (2006.01)

(52) U.S. Cl.
USPC ................ 349/58; 349/65; 362/612; 362/632

(58) Field of Classification Search
None
See application file for complete search history.

(56) References Cited

U.S. PATENT DOCUMENTS

| 2006/0214174 A1* | 9/2006 | Shirakuma et al. ............. 257/89 |
| 2007/0076431 A1 | 4/2007 | Atarashi et al. |
| 2008/0232134 A1* | 9/2008 | Weng et al. .................... 362/612 |
| 2008/0316771 A1* | 12/2008 | Mori et al. ..................... 362/633 |
| 2009/0316432 A1* | 12/2009 | Nittou ........................... 362/612 |
| 2011/0149602 A1* | 6/2011 | Lee et al. ....................... 362/612 |

FOREIGN PATENT DOCUMENTS

| JP | 2003-156739 | 5/2003 |
| JP | 2007-101766 | 4/2007 |

* cited by examiner

*Primary Examiner* — Wen-Ying P Chen
(74) *Attorney, Agent, or Firm* — Nixon & Vanderhye P.C.

(57) ABSTRACT

A backlight unit comprising: a light guide plate for causing light to exit in a planar manner from an upper surface of the light guide plate, the light having entered the light guide plate from an LED; a substrate provided along an end surface of the light guide plate and having an LED mounted on a counter surface of the substrate, the counter surface facing the end surface of the light guide plate; a frame provided along the substrate and attached to the substrate on a rear surface of the substrate, the rear surface being opposite to the counter surface; and one or a plurality of insulating members arranged in such a manner that the one or the plurality of insulating members and the frame sandwich the substrate, the one or the plurality of insulating members each fixing a screw point of a screw inserted from the frame into a through-hole provided through the frame and the substrate.

9 Claims, 12 Drawing Sheets

BACKLIGHT UNIT AND LIQUID CRYSTAL DISPLAY DEVICE

This Nonprovisional application claims priority under 35 U.S.C. §119(a) on Patent Application No. 2010-116205 filed in Japan on May 20, 2010, the entire contents of which are hereby incorporated by reference.

TECHNICAL FIELD

The present invention relates to a backlight unit and a liquid crystal display device.

BACKGROUND ART

Due to improvement in luminance of a white LED (Light Emitting Diode), a light source device employing a white LED has been used for a lighting apparatus and a liquid crystal TV. Such a light source device can be classified into a direct backlight device or an edge light backlight device.

The direct backlight device is mainly used for a liquid crystal TV and has a configuration in which a surface light source device is provided on a rear surface of a liquid crystal panel. The surface light source device is configured such that a plurality of white LEDs are mounted on a planar mounting substrate in matrix.

On the other hand, the edge light backlight device has a configuration in which a linear light source is provided on a side surface of a light guide plate that is provided on a rear surface of a liquid crystal panel. The linear light source is configured such that a plurality of white LEDs are mounted on a linear long-narrow mounting substrate along a longitudinal direction of the mounting substrate. Due to easiness in reducing a thickness of the edge light backlight device, the edge light backlight device makes it possible to provide a thin liquid crystal display TV and therefore has been attracting much attention.

The edge light backlight device can be further classified into two types. The first type employs an LED part called a side-view light emitting type LED. In the first type, an LED package side surface (a side surface of a reflector) serves as a mounting surface and light is emitted along a direction parallel to the mounting surface. The first type has been used in backlight devices or the like for which a luminance requirement is not very severe. An example of such backlight devices is a backlight device for a small-size to medium-size liquid crystal display device. Patent Literature 1 discloses a display device employing the first type. The second type employs an LED part called a top-view light emitting type LED. In the second type, an LED package bottom surface serves as a mounting surface, and light is emitted in a direction perpendicular to the mounting surface. Patent Literature 2 discloses a liquid crystal display device employing the second type.

In the first type employing the side-view light emitting type LED, an area of the LED package side surface serving as the mounting surface needs to be sufficiently wide so that stability is secured in a product after the mounting. Due to this, the first type has a reflector whose height is greater than that of the second type, and accordingly has a greater light loss in the reflector as compared to the second type.

On the other hand, in the second type employing the top-view light emitting type LED, there is a concern about efficiency in bonding of the LED package bottom surface and a light guide plate, because the LED package bottom surface serves as the mounting surface. However, it is possible to have a reflector whose height is smaller than that of the first type, and therefore the second type makes it possible to reduce light loss in the reflector.

Further, in a backlight device for a liquid crystal TV, high-luminance LEDs are employed and mounted in larger numbers. This increases a quantity of heat produced when the backlight device is driven. Due to this, LED packages are required to have higher levels of heat dissipation characteristics and heat resistance properties.

Regarding the side-view light emitting type LEDs, many products are formed by insert molding of a lead frame. In such a side-view light emitting type LED, the lead frame serves as a main heat dissipation path. Accordingly, the heat dissipation characteristics of an LED package depend on a length of a portion of the lead frame as measured down to the mounting surface and on a width and a thickness of the lead frame. In the side-view light emitting type LED, because the side surface of the reflector serves as a mounting surface, the length of a portion of the lead frame as measured down to the mounting surface is longer than that in the top-view light emitting type LED. Further, because the lead frame is to be bent, there is a limit in an extent to which the width and the thickness of the lead frame can be increased. This makes it difficult to obtain desired heat dissipation characteristics. Furthermore, in order to increase an area of an external terminal section of the lead frame (i.e., a surface portion bonded with the mounting surface), the area of the side surface of the reflector needs to be increased. This will cause an increase in light loss in the reflector.

On the other hand, in the top-view light emitting type LED, the thickness and the width of the lead frame cannot be easily increased because the lead frame is to be bent. However, because the LED package bottom surface serves as the mounting surface, the length of the portion of the lead frame as measured down to the mounting surface can be set shorter than that in the side-view light emitting type LED. Due to this, even if an area of an external terminal section of the lead frame (i.e., a surface portion bonded with the mounting surface) is increased, the increase will not have a negative effect on optical characteristics.

Therefore, for a large-size backlight device (edge light backlight device) of a liquid crystal TV or the like, the backlight device employing the top-view light emitting type LED is used.

CITATION LIST

Patent Literature 1
Japanese Patent Application Publication, Tokukai, No. 2007-101766 A (Publication Date: Apr. 19, 2007)
Patent Literature 2
Japanese Patent Application Publication, Tokukai, No. 2003-156739 A (Publication Date: May 30, 2003)

SUMMARY OF INVENTION

Technical Problem

In an edge light backlight device using LEDs, in order to fix a substrate having the LEDs mounted thereon, a screw is inserted from the mounting surface of the LEDs. FIG. 12 is a view illustrating a conventional edge light backlight device. (a) of FIG. 12 is a perspective view illustrating fixation of a substrate 101 having LEDs mounted thereon in the conventional edge light backlight device. (b) of FIG. 12 is a perspective view showing a positional relation between the substrate 101 having the LEDs mounted thereon and the light guide plate 107.

As illustrated in (a) of FIG. 12, through the substrate 101 having LEDs 102 mounted thereon, a screw 104 is inserted from a mounting surface 103 of the LEDs 102. The screw 104 is inserted into a substrate hole 105 of the substrate 101. The insertion of the screw 104 allows the substrate 101 having the LEDs 102 mounted thereon to be attached to a frame 106 (substrate-attached frame 106).

Here, a screw head 104t of the screw 104 is always larger than the substrate hole 105 into which the screw 104 is inserted. Because the screw 104 is made of metal, a wiring pattern on the substrate 101 needs to be formed in a manner avoiding the screw head 104t. This is for preventing a short circuit between wiring patterns that are apart from each other. Because of this, a width W101 of the substrate 101 is increased. The increase in the width W101 of the substrate 101 in the edge light backlight device will result in an increase in the thickness of a main body of the backlight device.

Further, as illustrated in (b) of FIG. 12, the light guide plate 107 is arranged to be close to the substrate 101 that is attached to the frame 106. Here, when the light guide plate 107 rattles or expands with heat, the light guide plate 107 and an LED 102 come into contact with each other. This breaks down the LED 102.

The present invention is accomplished in view of the aforementioned problem. An object of the present invention is to provide a backlight unit and a liquid crystal display device each capable of having a reduced thickness and reduced production costs.

Solution to Problem

In order to attain the object, a backlight unit according to the present invention is a backlight unit including: a light guide plate for causing light to exit in a planar manner from an upper surface of the light guide plate, the light having entered the light guide plate from a light source; a substrate provided along an end surface of the light guide plate and having an LED part, as the light source, mounted on a counter surface of the substrate, the counter surface facing the end surface of the light guide plate; a frame provided along the substrate and attached to the substrate on a rear surface of the substrate, the rear surface being opposite to the counter surface; and one or a plurality of insulating members arranged in such a manner that the one or the plurality of insulating members and the frame sandwich the substrate, the one or the plurality of insulating members each fixing a screw point of a screw inserted from the frame into a through-hole provided through the frame and the substrate.

According to the above-described invention, the screw is inserted from a rear surface of the frame into the through-hole provided through the frame and the substrate. This allows a screw head of the screw to be positioned not on the counter surface of the substrate but on the rear surface of the frame.

Therefore, in forming a wiring pattern on the counter surface, there is no need of forming the wiring pattern in a manner avoiding the screw head as in a conventional backlight unit. This allows the substrate to have a width that is smaller than a width of a conventional substrate. Thus, the backlight unit that makes it possible to reduce production costs as well as a thickness of the substrate can be provided.

Further, when the screw is inserted from the rear surface of the frame, the screw point of the screw will be exposed on the counter surface of the substrate. The screw point is fixed by means of the one or the plurality of insulating members that are not provided in a conventional backlight unit. That is, the substrate is sandwiched between the frame and the one or the plurality of insulating members. This makes it possible to provide and fix the substrate on a front surface of the frame.

Advantageous Effects of Invention

As described above, the backlight unit according to the present invention includes: a light guide plate for causing light to exit in a planar manner from an upper surface of the light guide plate, the light having entered the light guide plate from a light source; a substrate provided along an end surface of the light guide plate and having an LED part, as the light source, mounted on a counter surface of the substrate, the counter surface facing the end surface of the light guide plate; a frame provided along the substrate and attached to the substrate on a rear surface of the substrate, the rear surface being opposite to the counter surface; and one or a plurality of insulating members arranged in such a manner that the one or the plurality of insulating members and the frame sandwich the substrate, the one or the plurality of insulating members each fixing a screw point of a screw inserted from the frame into a through-hole provided through the frame and the substrate.

Therefore, it becomes possible to provide a backlight unit and a liquid crystal display device each capable of having a reduced thickness and reduced production costs.

BRIEF DESCRIPTION OF DRAWINGS

FIG. 1 is a perspective view of a liquid crystal display device according to an example regarding fixation of a substrate to a chassis.

FIG. 1

FIG. 3 is a perspective view of a liquid crystal display device according to another example regarding fixation of a substrate to a chassis.

FIG. 4 is a view illustrating widths of substrates. (a) is a cross-sectional view showing a width of a substrate according to one embodiment of the present invention. (b) is a cross-sectional view showing a width of a conventional substrate as illustrated in FIG. 12.

FIG. 5 is a view illustrating wiring patterns of a substrate according to an embodiment of the present invention. (a) and (b) are plan views respectively illustrating exemplary wiring patterns of the substrate according to the embodiment of the present invention.

FIG. 6 is a view illustrating fixation of a substrate to a frame, the substrate having formed thereon the wiring pattern as illustrated in (a) of FIG. 5. In FIG. 6, (a) is a plan view; (b) is a cross-sectional view taken along the line A-A' in (a) of FIG. 6; and (c) is an equivalent circuit diagram.

FIG. 7 is a view illustrating a first modified example of FIG. 6. (a) is a plan view and (b) is an equivalent circuit diagram.

FIG. 8 is a view illustrating a second modified example of FIG. 6. (a) is a plan view; (b) is a cross-sectional view taken along the line A-A' in (a) of FIG. 8; and (c) is an equivalent circuit diagram.

FIG. 9 is a view showing fixation of a substrate to a frame, the substrate has formed thereon the wiring pattern as illustrated in (b) of FIG. 5. In FIG. 9, (a) is a plan view; (b) is a cross-sectional view taken along the line A-A' in (a) of FIG. 9; and (c) is an equivalent circuit diagram.

FIG. 10 is a perspective view illustrating expansion of a light guide plate.

FIG. 11 is a view illustrating breakage of an LED due to expansion of a light guide plate. (a) is a plan view showing that the breakage of the LED due to the expansion of the light guide plate can be prevented in a backlight unit according to an embodiment of the present invention. (b) is a plan view showing that the breakage of the LED due to the expansion of the light guide plate cannot be prevented in a backlight unit employing an insulating member that is shorter than the LED in length along a direction perpendicular to a counter surface.

Figure 12:
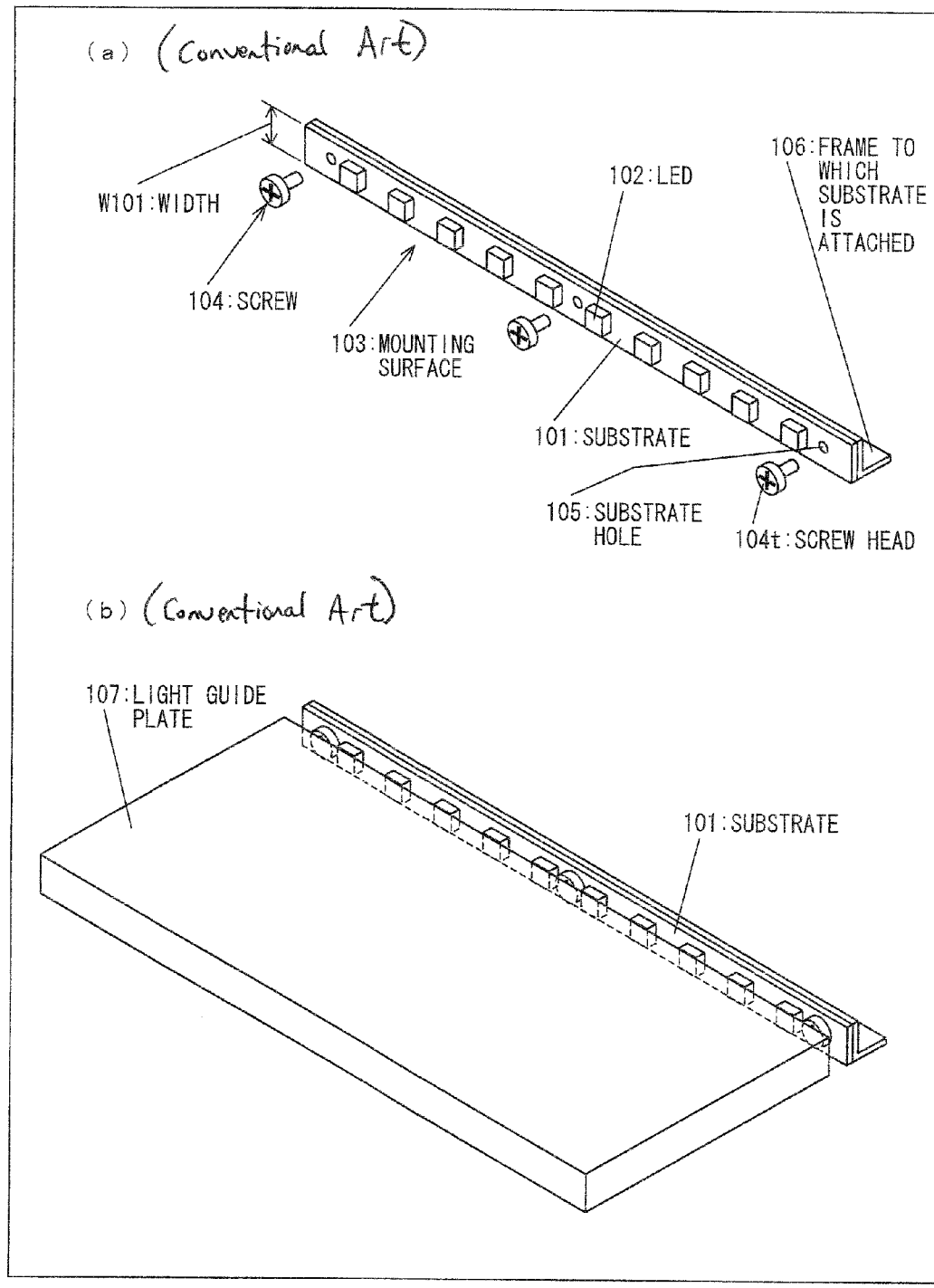
FIG. 12

(a) of FIG. 12 is a perspective view illustrating fixation of a substrate having LEDs mounted thereon in a conventional edge light backlight device and (b) of FIG. 12 is a perspective view showing a positional relation between the substrate having the LEDs mounted thereon and a light guide plate.

DESCRIPTION OF EMBODIMENTS

One embodiment of the present invention will be described below with reference to FIGS. 1 to 11. First, with reference to FIG. 2, a description will be given on fixation of a substrate 3, which has LEDs (Light Emitting Diodes) 2 (light sources, LED parts) mounted thereon, to a frame 4 according to one embodiment of the present invention.

[Fixation of Substrate 3 Having LEDs 2 Mounted thereon to Frame 4]

Figure 2:
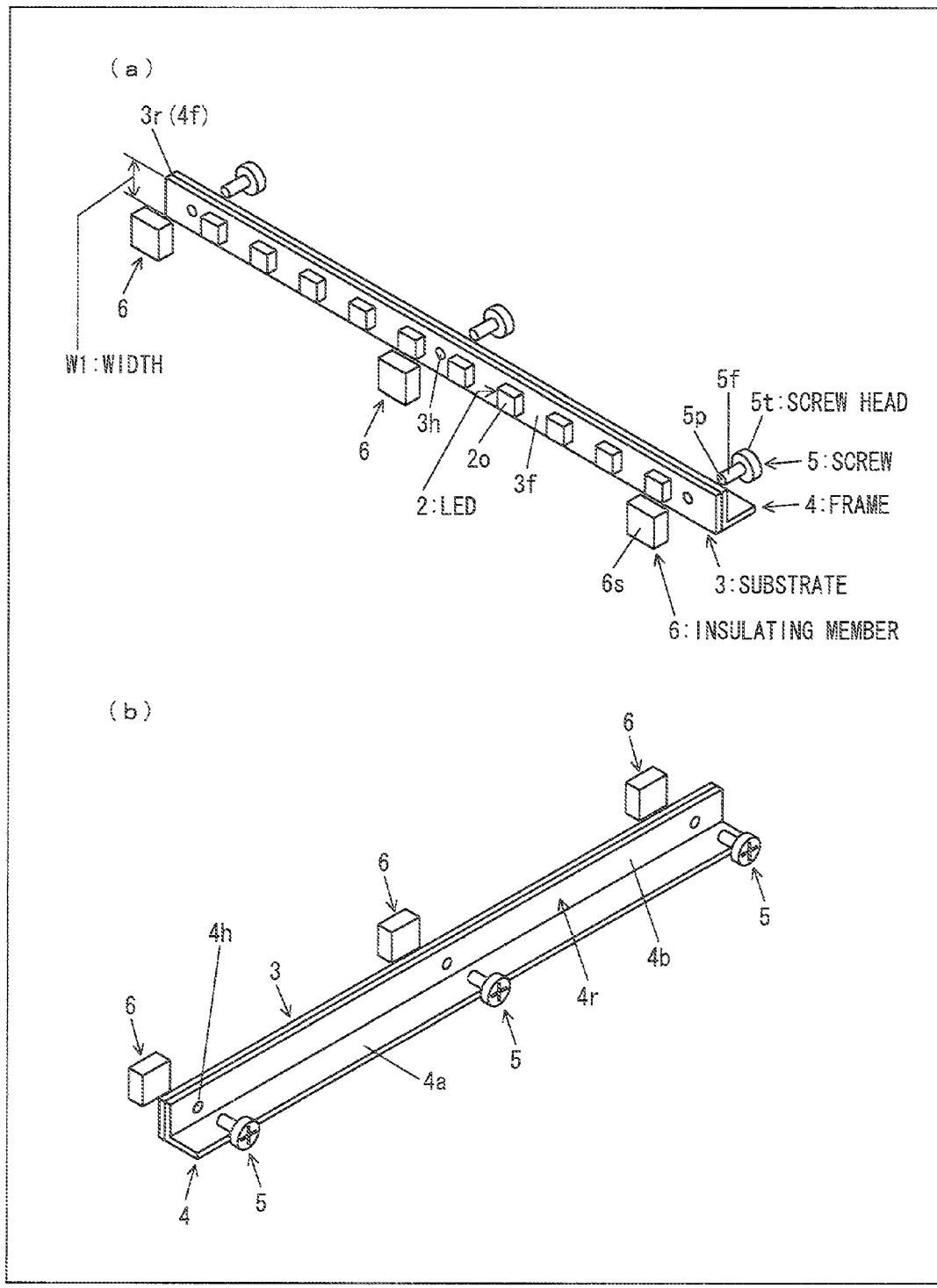
FIG. 2 is a view illustrating fixation of a substrate to a frame according to one embodiment of the present invention, the substrate having LEDs mounted thereon. (a) is a perspective view of the substrate having the LEDs mounted thereon in a case where the substrate is viewed from a counter surface side of the substrate. (b) is a perspective view of the frame to which the substrate is fixed in a case where the frame is viewed from a rear surface side of the frame.

FIG. 2 is a view illustrating fixation of the substrate 3 having the LEDs 2 mounted thereon to the frame 4 in the present embodiment. (a) of FIG. 2 is a perspective view of the substrate 3 having the LEDs 2 mounted thereon in a case where the substrate 3 is viewed from a counter surface 3f side of the substrate 3. (b) of FIG. 2 is a perspective view of the frame 4 fixing the substrate 3 in a case where the frame 4 is viewed from a rear surface 4r side of the frame 4.

The substrate 3 is provided along an end surface 7e of a light guide plate 7 to be described later and has the LEDs 2 mounted on a counter surface 3f of the substrate 3 which counter surface 3f faces the end surface 7e.

The frame 4 is a plate member having an L-shaped cross section. The frame 4 includes (i) a first plate portion 4a that is fixed to a chassis 8 (chassis) to be described later and (ii) a second plate portion 4b that is provided along the substrate 3 and attached to a rear surface of the substrate 3 which rear surface is opposite to the counter surface. The first plate portion 4a and the second plate portion 4b are integrally formed. Use of such a frame 4 makes it possible to provide and fix the substrate 3 on a front surface 4f of the frame 4, and also makes it possible to fix the frame 4 to the chassis 8.

As illustrated in (a) and (b) of FIG. 2, the substrate 3 has the LEDs 2 mounted on the counter surface 3f of the substrate 3. Each LED 2 is mounted on the counter surface 3f of the substrate 3 in such a manner that a light exit plane 2o of the LED 2 faces the end surface 7e of the light guide plate 7 to be described later.

The substrate 3 and the frame 4 are superimposed on each other such that a rear surface 3r of the substrate 3 and the front surface 4f of the frame 4 face each other. This makes it possible to provide a through-hole penetrating the substrate 3 and the frame 4. A substrate-fixing hole 3h is provided through the substrate 3 and a substrate-fixing hole 4h is provided through the frame 4, and the substrate-fixing holes 3h and 4h serve as the through-hole.

A screw 5 (screw) fixes the substrate 3 to the frame 4, and has a screw head 5t and a screw point 5p. The screw 5 is inserted, from the frame 4 (the rear surface 4r of the frame 4), into the through-hole (the substrate-fixing hole 4h and the substrate-fixing hole 3h) that is provided through the frame 4 and the substrate 3. This allows the screw head 5t of the screw 5 to be positioned not on the counter surface 3f of the substrate 3 but on the rear surface 4r of the frame 4. Therefore, in forming a wiring pattern on the counter surface 3f, there is no need of forming the wiring pattern in a manner avoiding the screw head 5t. This allows the substrate 3 to have a width W1 that is smaller than a width W101 of the substrate 101 as illustrated in FIG. 12. Thus, it becomes possible to provide a backlight unit 1 (see FIG. 1) that makes it possible to reduce production costs as compared to a conventional backlight.

The screw 5 is preferably a metal screw. The use of a metal screw can reduce costs as compared to a case where a screw made of resin or ceramics is used.

The through-hole into which the screw 5 is to be inserted does not necessarily need to be formed between two adjacent LEDs 2. The through-hole may be formed for every plurality of LEDs, for example, every two LEDs or every three LEDs.

When the screw 5 is inserted from the frame 4, the screw point 5p of the screw 5 will be exposed on the counter surface 3f of the substrate 3. The screw point 5p is fixed by means of one or a plurality of insulating members 6 that are not provided in a conventional backlight unit. That is, the substrate 3 is sandwiched between the second plate portion 4b of the frame 4 and the insulating member 6. This makes it possible to provide and fix the substrate 3 on the front surface 4f of the frame 4.

Here, examples 1 and 2 regarding fixation of a substrate 3 to a chassis will be described below with reference to FIGS. 1 and 3.

EXAMPLE 1

Regarding Fixation of Substrate 3 to Chassis

Figure 1:
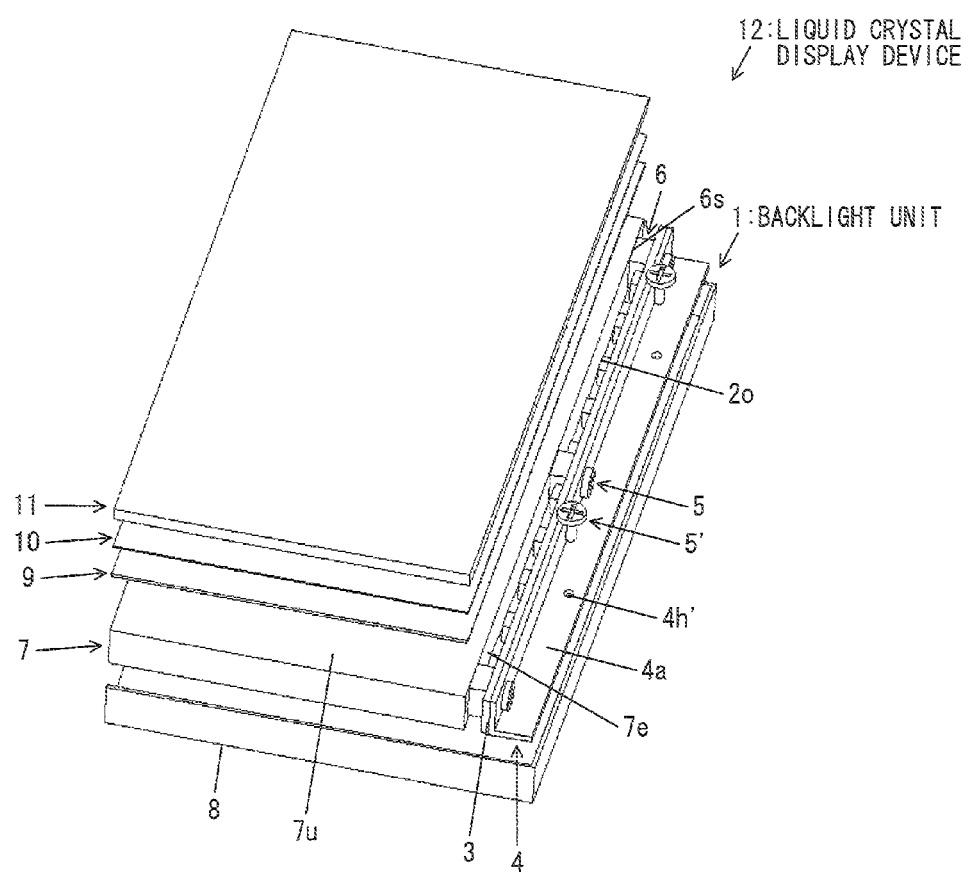
FIG. 1

FIG. 1 is a perspective view of a liquid crystal display device 12 according to the present example 1. The liquid crystal display device 12 has an LED 2, a substrate 3, a frame 4, a screw 5, an insulating member 6, a light guide plate 7, a chassis 8, optical sheets 9 and 10, and a liquid crystal panel 11. In FIG. 1, the LED 2, the substrate 3, the frame 4, the screw 5, the insulating member 6, and the light guide plate 7 constitute a backlight unit 1 according to the present example 1. Since the liquid crystal display device 12 includes the backlight unit 1, it is possible to provide the liquid crystal display device 12 that makes it possible to reduce production costs as compared to a conventional liquid crystal display device.

As described above, the light guide plate 7 causes light having entered the light guide plate 7 from the light source (LED 2 in this case), to exit in a planar manner from the upper surface of the light guide plate 7. More specifically, the light guide plate 7 guides the light having entered the light guide plate 7 from the light source, while changing a light path of the light. In this way, the light guide plate 7 causes planar illumination light emission from an upper surface 7u of the light guide plate 7 toward an object to be illuminated (i.e., optical sheets 9 and 10 and a liquid crystal panel 11 in this case). Also, the light guide plate 7 is arranged in such a manner that an end surface 7e of the light guide plate 7 faces a counter surface 3f of the substrate 3 and a light exit plane 2o of the LED 2. Further, the chassis 8 houses the light guide plate 7 and the substrate 3 that is fixed to the frame 4. The frame 4 that fixes the substrate 3 housed in the chassis 8 has a frame fixing hole 4h' in a first plate portion 4a. A screw 5' is inserted into the frame fixing hole 4h', whereby the frame 4 is fixed to the chassis 8.

The optical sheets 9 and 10 are provided between the liquid crystal panel 11 and the light guide plate 7 so as to be parallel to the upper surface 7u of the light guide plate 7, and the optical sheets 9 and 10 have the following functions. That is, in a light reception area where light emitted from the light guide plate 7 is received from directly below, the optical sheets 9 and 10 have a function of decreasing a luminance by guiding part of the received light toward the light guide plate 7. In addition, in an area other than the light reception area, the optical sheets 9 and 10 have a function of increasing a luminance by guiding the received light toward the liquid crystal panel 11, thereby rendering light distribution uniform. Also, a rear surface of the liquid crystal panel 11 is arranged to be parallel to the optical sheets 9 and 10.

EXAMPLE 2

Regarding Fixation of Substrate 3 to Chassis

Example 2 regarding fixation of a substrate 3 to a chassis 8 will be described below with reference to FIG. 3. Note that configurations of Example 2 other than configurations to be explained in the following description of Example 2 are the same as those of above-described Example 1. For easy explanation, the same reference signs will be given to members each having the same function as a member as illustrated in FIG. 1 of Example 1, and descriptions on such a member will be omitted.

Figure 3:
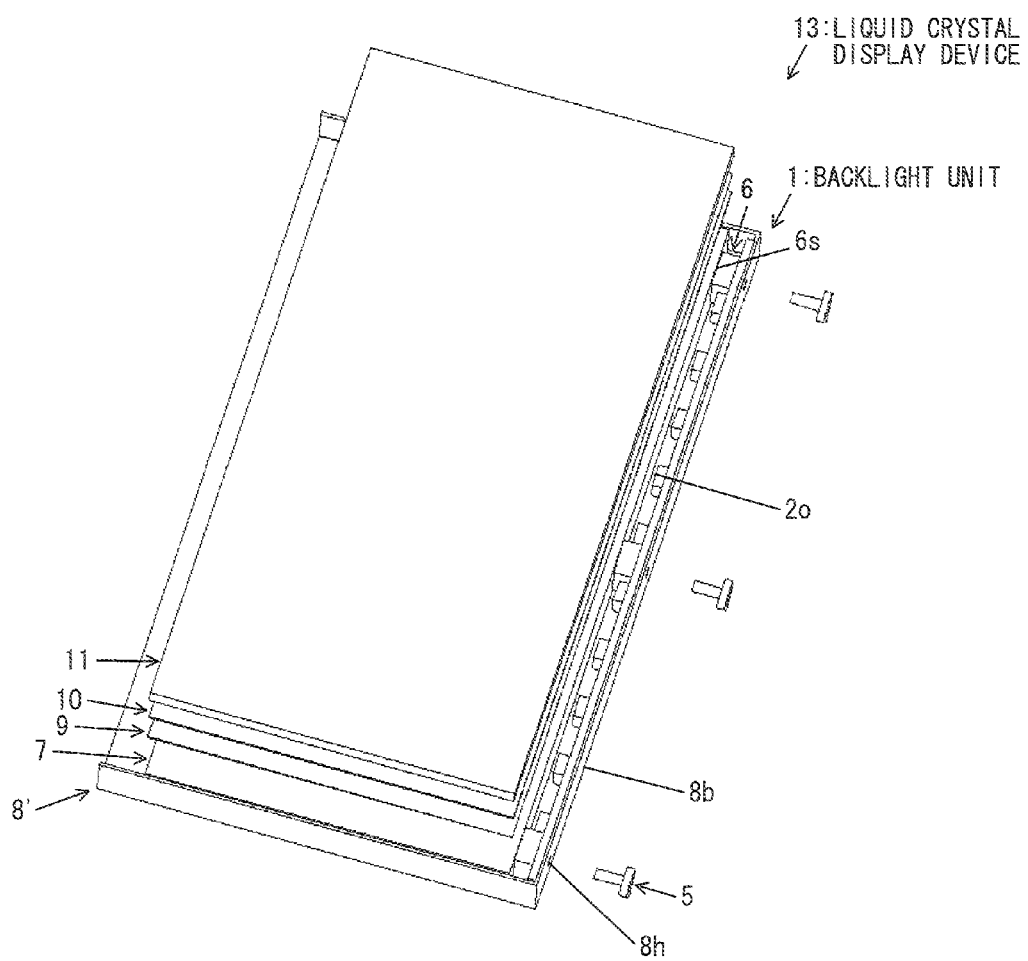
FIG. 3

FIG. 3 is a perspective view of a liquid crystal display device 13 according to the present example 2. In the liquid crystal display device 13, the light guide plate 7 is housed in a chassis 8' (integrated chassis) which is formed by integrating the frame 4 and the chassis 8 of Example 1.

More specifically, a plate portion 8b of the chassis 8' corresponds to the second plate portion 4b of the frame 4 and a substrate-fixing hole 8h provided in the plate portion 8b corresponds to the substrate-fixing hole 4h in the frame 4. Thus, it becomes possible to sandwich the substrate 3 between the plate portion 8b of the chassis 8' and the insulating member 6. This makes it possible to fix the substrate 3 to the plate portion 8b of the chassis 8'.

Next, a width W1 of the substrate 3 will be described below with reference to FIG. 4.

[Width of Substrate 3]

Figure 4:
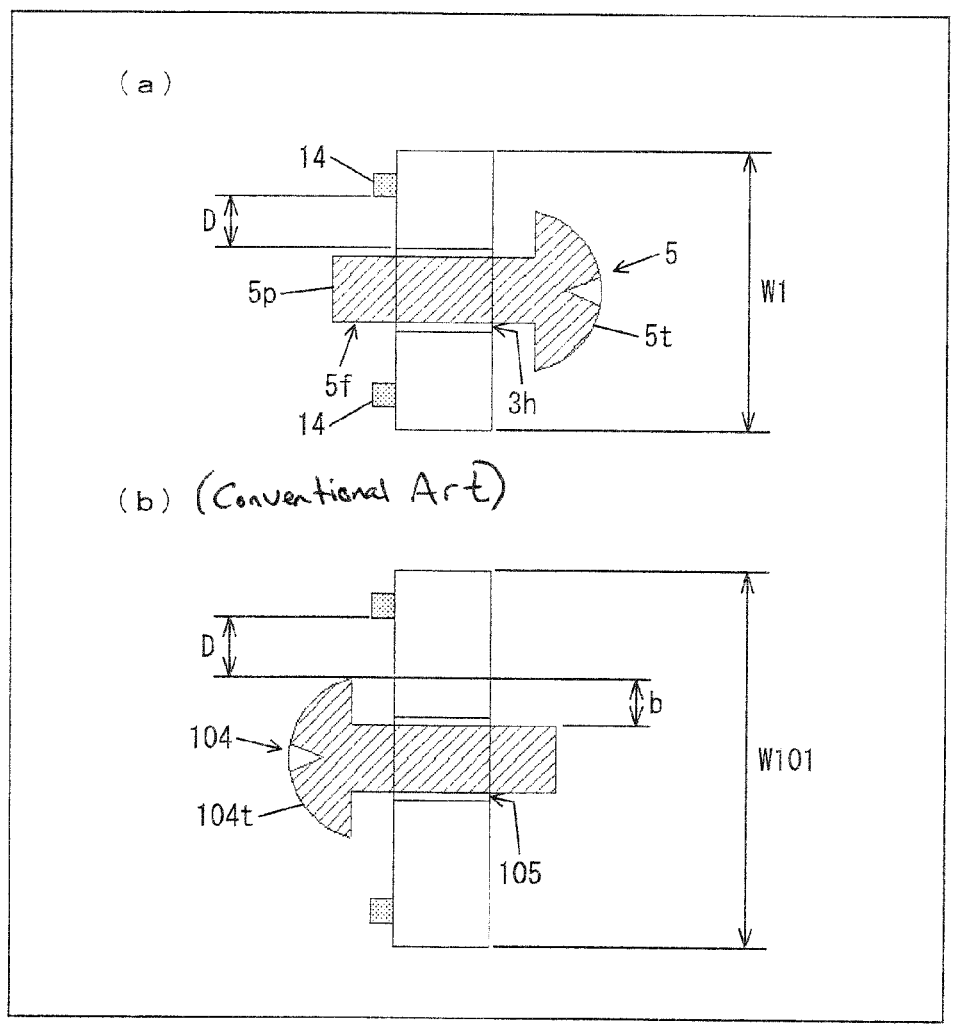
FIG. 4

FIG. 4 is a view illustrating widths of substrates. (a) of FIG. 4 is a cross-sectional view showing the width W1 of the substrate 3 according to the present embodiment. (b) of FIG. 4 is a cross-sectional view showing a width W101 of the conventional substrate 101 as illustrated in FIG. 12.

Generally, a substrate 3 having LEDs 2 mounted thereon is fixed by use of a metal screw 5. At this time, for safe design, a predetermined distance D is required between the metal body (screw 5) and a wiring pattern 14 formed on the counter surface 3f of the substrate 3.

According to IEC standard 60065, which prescribes 'minimum clearances and minimum creepage distances for printed boards,' the predetermined distance D needs to satisfy the following formula (I) where V is an applied voltage. In the present embodiment, the applied voltage V is applied to an input 23 of an LED row that is configured by connecting a plurality of LEDs 2 in series.

$$\mathrm{Log}_{10}D = 0.78 \times \mathrm{Log}_{10}(V/300) \tag{1}$$

For example, in a case where an applied voltage of 100V is applied to the input 23 of the LED row in the substrate, the distances D as shown in (a) and (b) of FIG. 4 need to be at least 0.42 mm.

Further, the screw 5 has a difference b between a radius of the screw head 5t and a radius of a screw shaft 5f (likewise, the screw 104 as illustrated in FIG. 12 also has a difference b). In a case where a screw M2 (metric screw having a diameter φ of 2 mm) is used, the difference b is approximately 1.0 mm. In a case where a screw M3 (metric screw having a diameter φ of 3 mm) is used, the difference b is approximately 1.3 mm.

Therefore, by fixing the substrate 3 according to the present embodiment, the width W1 of the substrate 3 can be reduced by 2×b (mm), in a case where the substrate 3 has a wiring pattern 14 on both sides of the substrate-fixing hole 3h ((a) of FIG. 4 and (a) of FIG. 5 that is to be described later). Likewise, the width W1 of the substrate 3 can be reduced by b (mm), in a case where the substrate 3 has a wiring pattern 19 on one side of the substrate-fixing hole 3h ((b) of FIG. 5 to be described later).

Next, the wiring pattern of the substrate 3 will be described below with reference to FIGS. 5 to 9.

[Wiring Patterns of Substrate 3]

Figure 5:
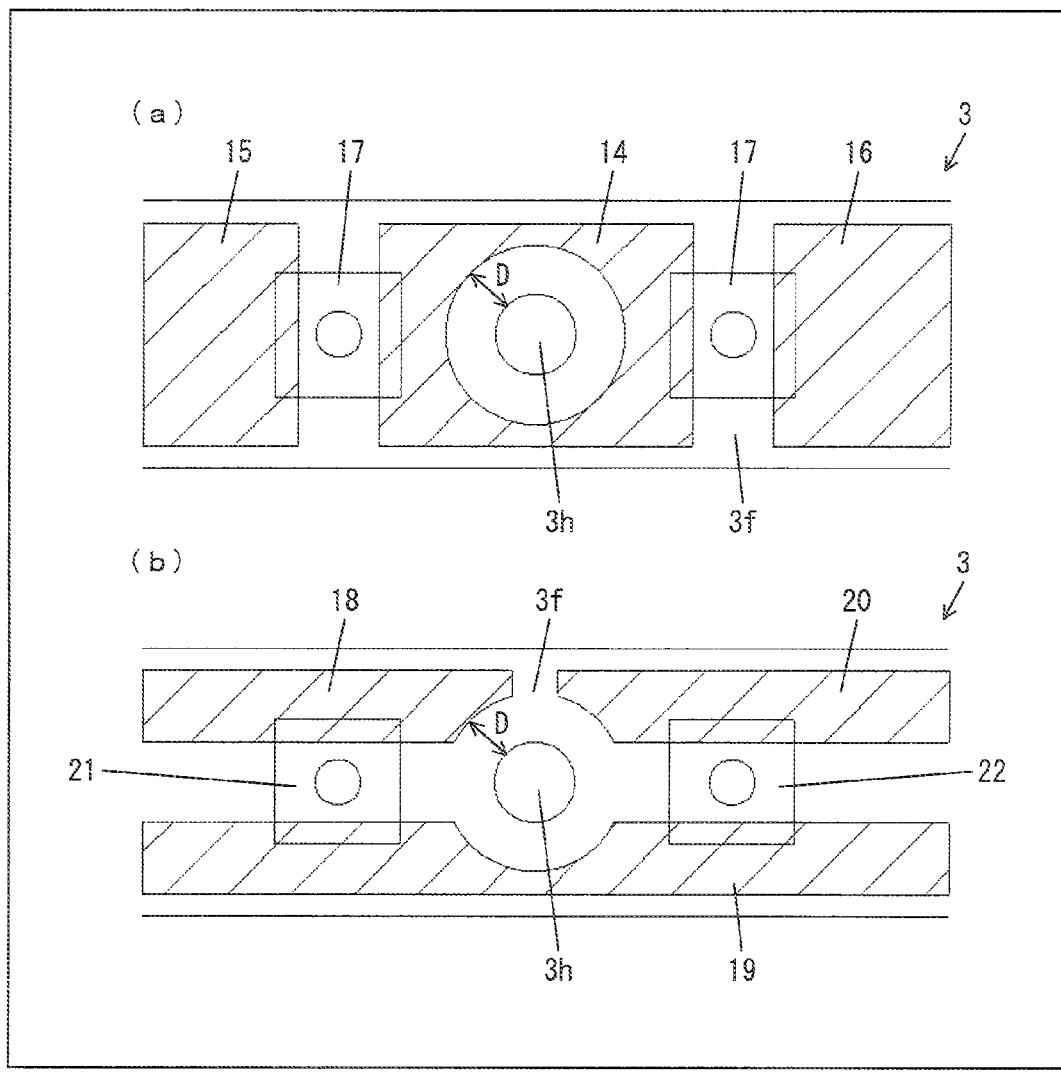
FIG. 5

FIG. 5 is a view illustrating wiring patterns of the substrate 3 according to the present embodiment. (a) and (b) of FIG. 5 are plan views showing exemplary wiring patterns of the substrate 3 according to the present embodiment. The substrate 3 as illustrated in (a) of FIG. 5 has wiring patterns 14 to 16 that are formed on the counter surface 3f. Also, LED-mounting areas 17 are formed between the wiring pattern 15 and the wiring pattern 14 and between the wiring pattern 14 and the wiring pattern 16, respectively. An LED 2 is mounted in each of the LED-mounting areas 17 so that an anode and a cathode of the LED 2 are positioned along a longitudinal direction of the substrate 3. According to this configuration, the plurality of LEDs 2 are mounted on the substrate 3 in the same orientation as illustrated in (c) of FIG. 6 to be described later. This makes it possible to shorten time required for production of the substrate 3 as compared to that required for production of a conventional substrate.

The substrate 3 as illustrated in (b) of FIG. 5 has wiring patterns 18 to 20 formed on the counter surface 3f. Also, an LED-mounting area 21 is formed between the wiring pattern 18 and the wiring pattern 19. Further, an LED-mounting area 22 is formed between the wiring pattern 19 and the wiring pattern 20. The LED-mounting areas 21 and 22 are similar to each other in that an anode and a cathode of each LED 2 are positioned along a lateral direction of the substrate 3, but different in terms of an orientation of the mounted LEDs 2. That is, in a case where an LED 2 is mounted in the LED-mounting area 21 in such a manner that the wiring pattern 18 and an anode of the LED 2 are connected to each other, the wiring pattern 20 and a cathode of another LED 2 are connected to each other in the LED-mounting area 22. In this way, the orientations of the LEDs 2 are alternately changed (see (c) of FIG. 9).

When wiring patterns are formed on the long-narrow substrate without alternately changing the orientations of the LEDs 2, the wiring patterns become thinner than those in a case where the orientations of the LEDs 2 are alternately changed. By employing the configuration in which the orientations of the LEDs 2 are alternately changed, it becomes possible to prevent deterioration in heat dissipation effect for the LEDs 2 that generate heat, which deterioration may otherwise be caused by the thinned wiring patterns. Therefore, it is possible to prevent a decrease in light emitting efficacy of the LEDs 2.

Figure 6:
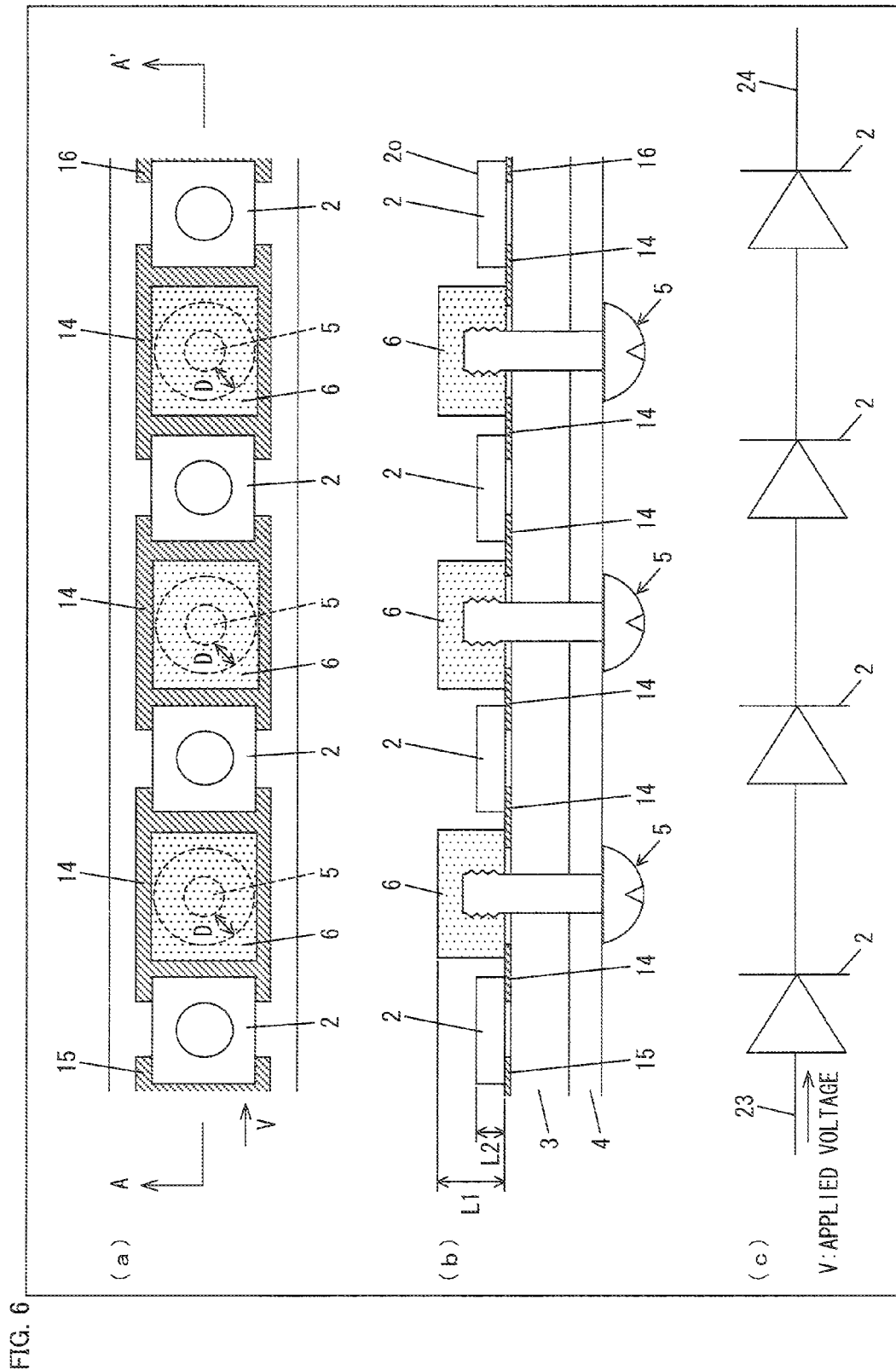
FIG. 6

FIG. 6 is a view illustrating fixation of the substrate 3 to the frame 4 which substrate 3 has formed thereon wiring patterns 14 to 16 as illustrated in (a) of FIG. 5. In FIG. 6, (a) is a plan view; (b) is a cross-sectional view taken along the line A-A' in (a) of FIG. 6; and (c) is an equivalent circuit diagram. By forming the wiring patterns 14 to 16, an input 23 and an output 24 of an LED row configured by a plurality of LEDs 2 connected in series are provided on different sides on the substrate 3, respectively.

Further, in FIG. 6, a length L1 of the insulating member 6 along a direction perpendicular to the counter surface 3f is set longer than a length L2 of each LED 2 along a direction perpendicular to the counter surface 3f. This prevents the LED 2 from being broken down due to a contact of the light guide plate 7 to the LED2, when the light guide plate 7 expands. Therefore, it becomes possible to provide the backlight unit 1 whose failure rate is lower than that of a conventional backlight unit. That is, the backlight unit 1 including the substrate 3 having the insulating member 6 can have an improved reliability as compared to a conventional backlight unit. Note that the length L1 of the insulating member 6 is a height of the insulating member 6 as measured from the counter surface 3f of the substrate 3 to a front surface 6s of the insulating member 6. The length L2 of the LED 2 is a height of the LED 2 as measured from the counter surface 3f of the substrate 3 to the light exit plane 2o of the LED 2 (i.e., front surface of the LED part).

Figure 7:
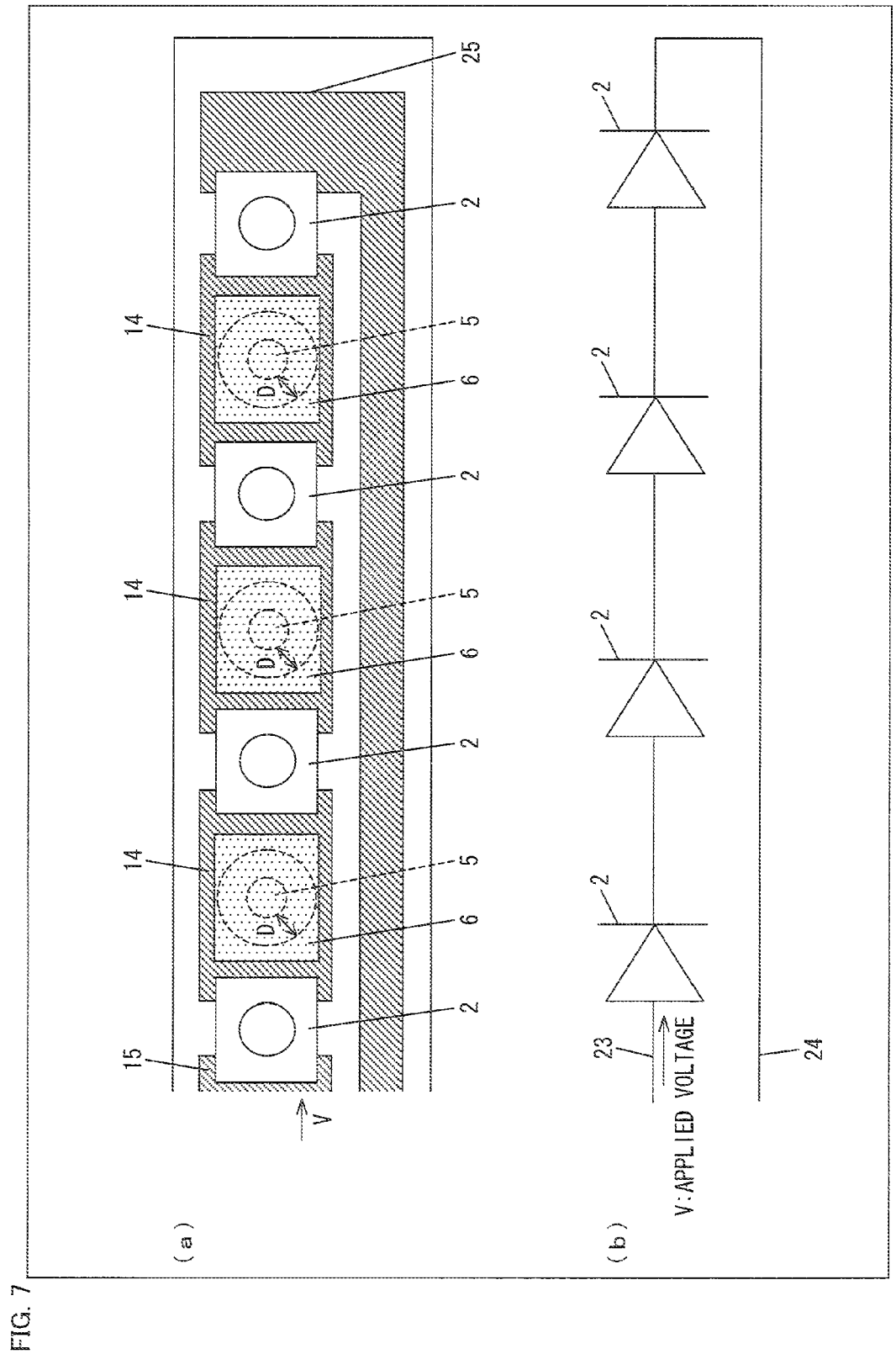
FIG. 7

FIG. 7 is a view illustrating a first modified example of FIG. 6. In FIG. 7, (a) is a plan view and (b) is an equivalent circuit diagram. The substrate 3 as illustrated in FIG. 7 has formed thereon a wiring pattern 25 in addition to the wiring patterns 14 and 15. By forming the wiring pattern 25, the input 23 and the output 24 of the LED row are provided on the same side on the substrate 3.

Figure 8:
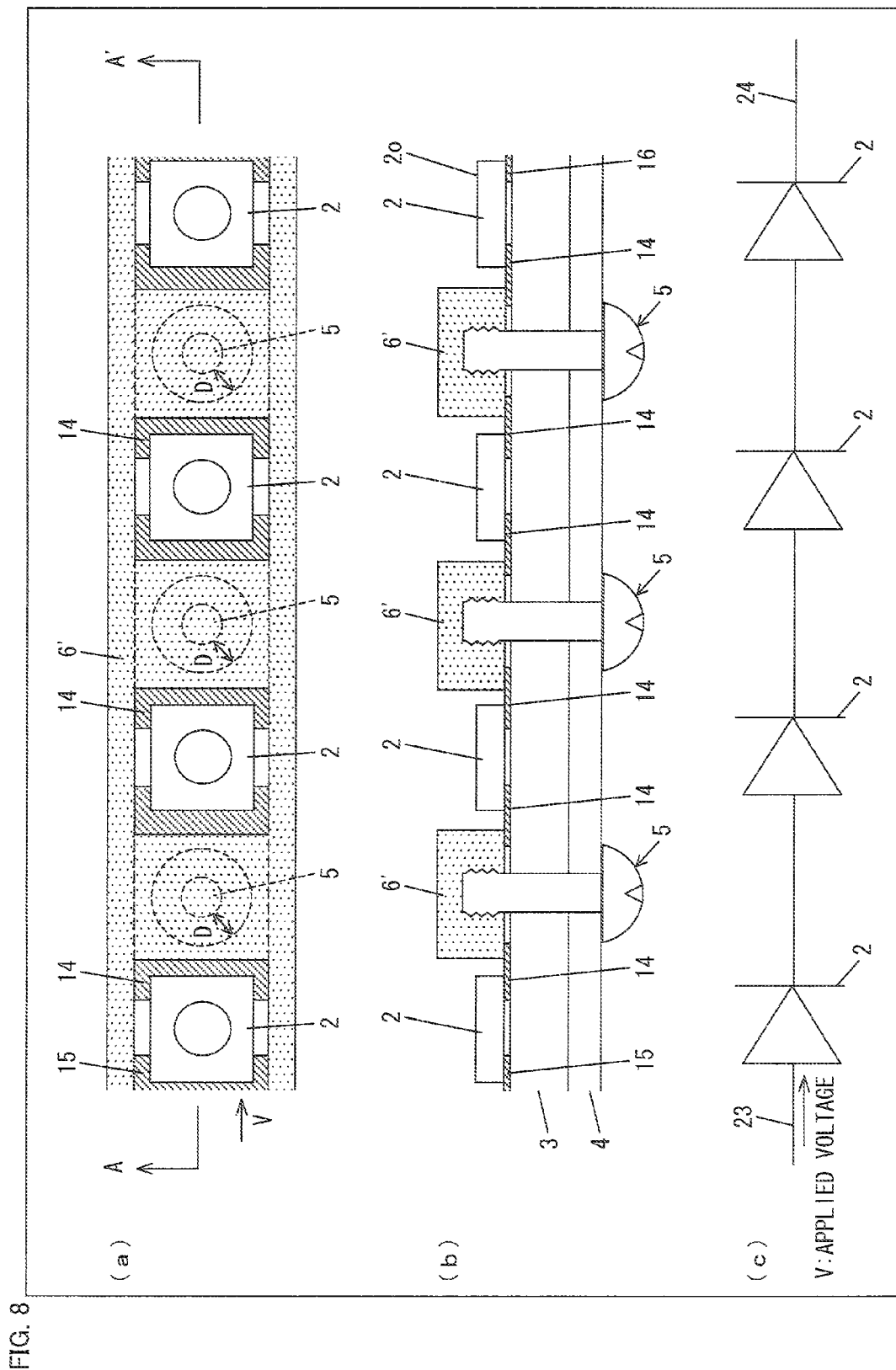
FIG. 8

FIG. 8 is a view illustrating a second modified example of FIG. 6. In FIG. 8, (a) is a plan view; (b) is a cross-sectional view taken along the line A-A' in (a) of FIG. 8; and (c) is an equivalent circuit diagram. Whereas one insulating member 6 is provided to one screw 5 in FIG. 6, a plurality of insulating members 6 are integrally formed to constitute an insulating member 6' in FIG. 8. The insulating member 6' allows the light guide plate 7 to touch the insulating member 6' more reliably than the insulating member 6, when the light guide plate 7 expands.

Figure 9:
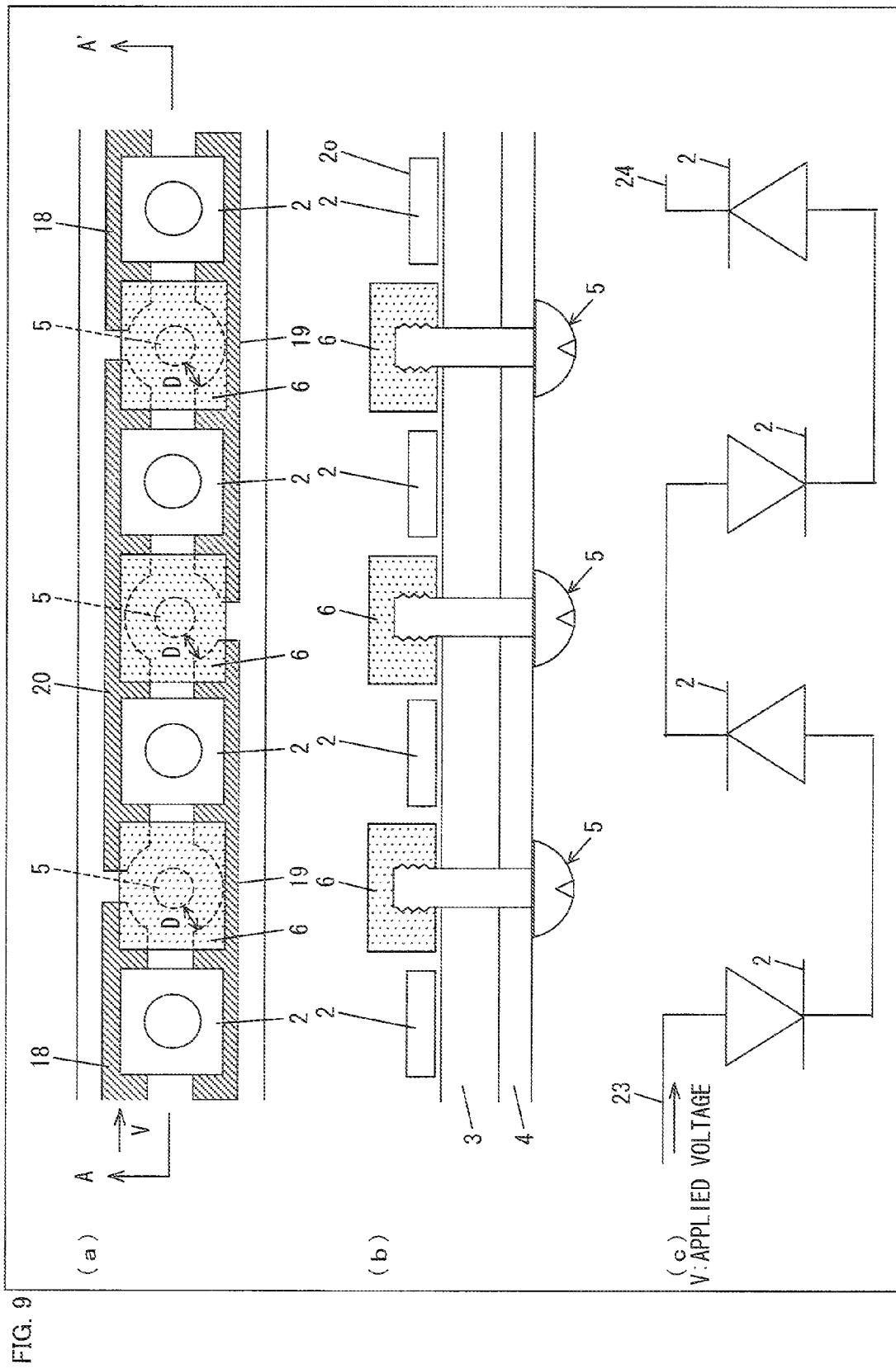
FIG. 9

FIG. 9 is a view illustrating fixation of the substrate 3 to the frame 4 which substrate 3 has formed thereon the wiring patterns 18 to 20 as illustrated in (b) of FIG. 5. In FIG. 9, (a) is a plan view; (b) is a cross-sectional view taken along the line A-A' in (a) of FIG. 9; and (c) is an equivalent circuit diagram. By forming the wiring patterns 18 to 20, it becomes possible to alternately change the orientations of the plurality of LEDs 2.

Next, expansion of the light guide plate 7 will be described below with reference to FIGS. 10 and 11.

[Expansion of Light Guide Plate 7]

Figure 10:
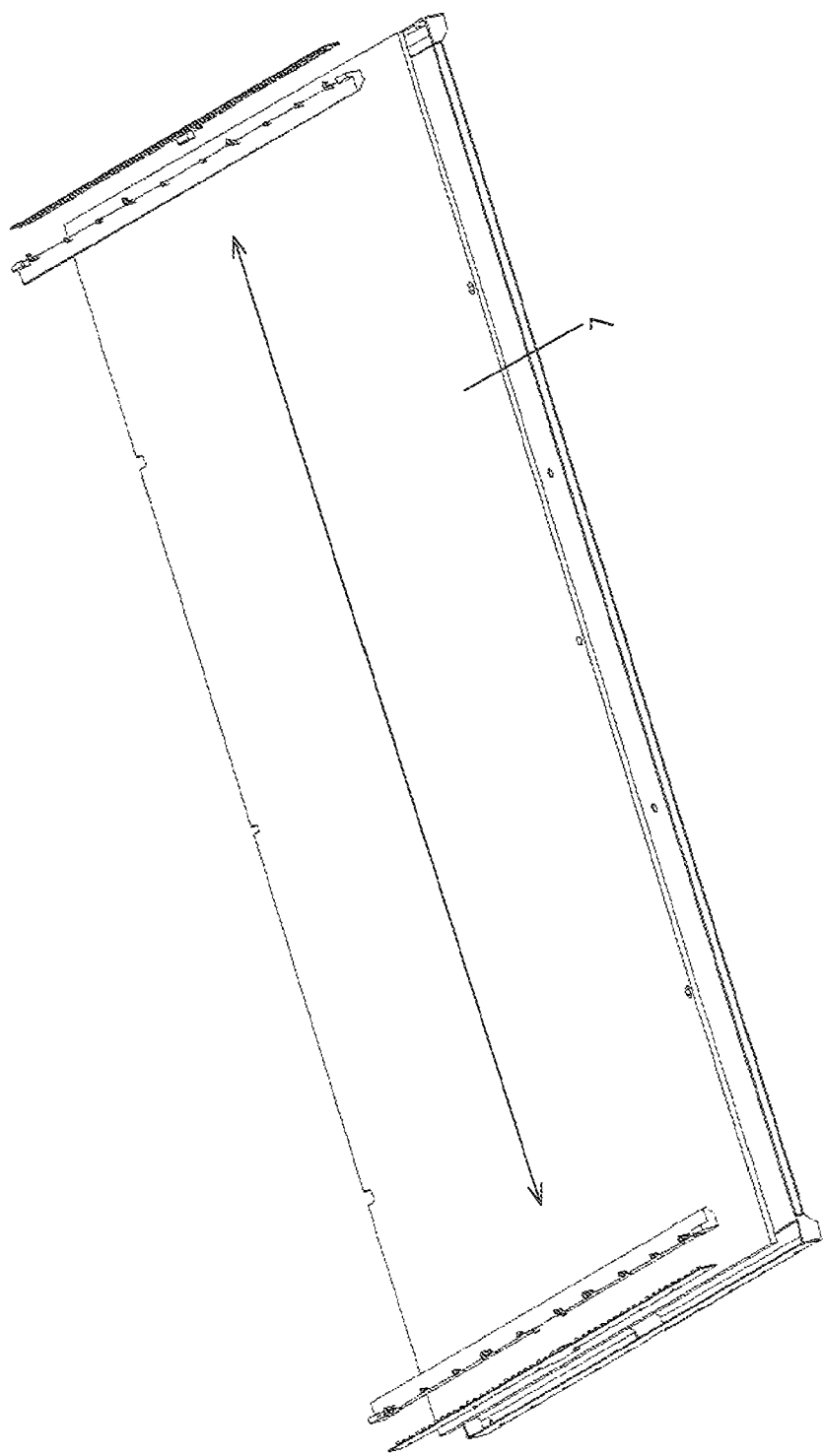
FIG. 10

FIG. 10 is a perspective view illustrating expansion of the light guide plate 7. The light guide plate 7 expands in a direction indicated by an arrow in FIG. 10, for the following reasons.

In a product in which the backlight unit 1 according to the present embodiment is incorporated in a system, there is possibility that the backlight unit 1 is placed in an environment where an environmental temperature is elevated by nearly 60° C. from the surrounding temperature.

The light guide plate 7 is made of acrylic resin, polycarbonate resin or the like. In a case where the backlight unit 1 is incorporated in a large-size TV, a 60° C. temperature rise of the light guide plate 7 from the normal temperature will result in an expansion of the light guide plate 7 by about 4.2% in length along a longitudinal direction of the light guide plate 7 and in thickness of the light guide plate 7.

In view of this, in the backlight unit 1 according to the present embodiment, the insulating member 6 with a height (length L1) that is greater than the length L2 of the LED 2 is provided between the substrate 3 and the light guide plate 7, as described above. This prevents the light guide plate 7 from directly touching the LED 2 even when the light guide plate 7 expands. As a result, no stress will be applied on the LED 2. Therefore, it becomes possible to prevent the LED 2 from being broken down due to the expansion of the light guide plate 7. A concrete example of this will be given below.

Figure 11:
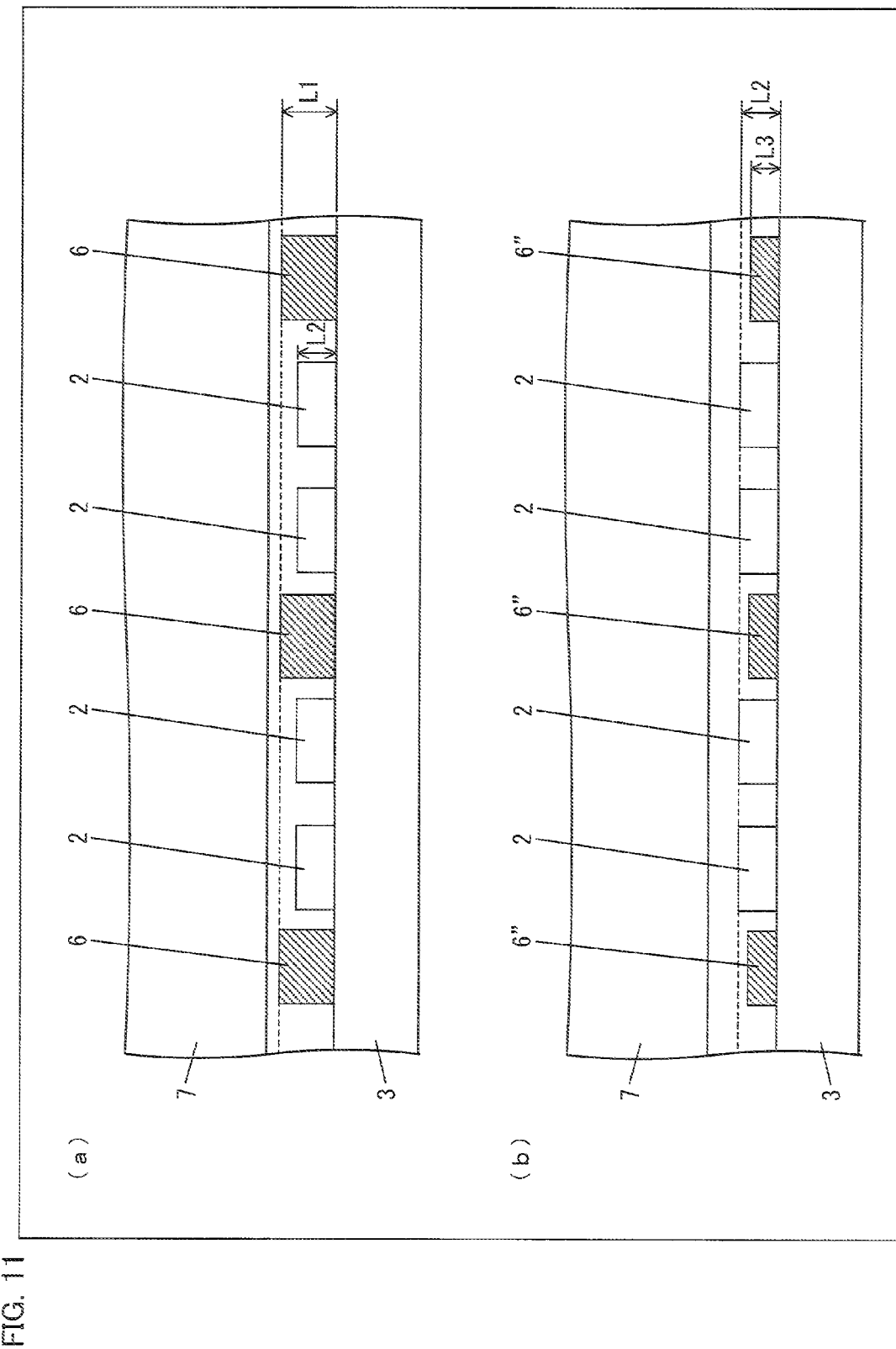
FIG. 11

FIG. 11 is a view illustrating breakage of the LED 2 caused by an expansion of the light guide plate 7. (a) of FIG. 11 is a plan view showing that the breakage of the LED 2 due to an expansion of the light guide plate 7 can be prevented in the backlight unit 1 according to the present embodiment. (b) of FIG. 11 is a plan view showing that the breakage of the LED 2 due to an expansion of the light guide plate 7 cannot be prevented in the backlight unit 26 employing an insulating member 6" that has a smaller height than that of the LED 2.

In both (a) and (b) in FIG. 11, the light guide plate 7 expands up to positions indicated by respective broken lines.

In the backlight unit 1 as illustrated in (a) of FIG. 11, when the light guide plate 7 expands, the light guide plate 7 touches the insulating member 6 before touching the LED 2. Due to this, even when the light guide plate 7 expands, the light guide plate 7 does not touch the LED 2 directly. On the other hand, the backlight unit 26 as illustrated in (b) of FIG. 11 employs the insulating member 6". A length (length L3) of the insulating member 6" along a direction perpendicular to the counter surface 3f is shorter than the length L2 of the LED 2. Due to this, when the light guide plate 7 expands, the light guide plate 7 touches the LED 2 at a section indicated by the broken line. Therefore, there is possibility that the LED 2 gets broken down as a result of a stress applied to the LED 2.

Further, since a lower portion of the insulating member 6 is fixed by the metal screw 5, the insulating member 6 can be considered as if the insulating member 6 were a hard material. Accordingly, a shock-absorbing material may be formed on a surface of the insulating member 6 so as to prevent an influence on optical characteristics of the light guide plate 7 due to a deformation of the light guide plate 7 which deformation is caused by a contact between the light guide plate 7 and the insulating member 6.

The liquid crystal display device according to the present invention includes the liquid crystal panel and the backlight unit emitting light to the rear surface of the liquid crystal panel. This configuration makes it possible to provide the liquid crystal display device capable of having a reduced thickness and reduced production costs.

The present invention is not limited to the above-described embodiments but allows various modifications within the scope of the claims. Any embodiment obtained by appropriately combining the technical means disclosed in the different embodiments will also be included in the technical scope of the present invention.

Industrial Applicability

The backlight unit of the present invention is capable of having a reduced thickness and reduced production costs and therefore can be suitably applied to a liquid crystal display device.

REFERENCE SIGNS LIST

1: backlight unit
2: LED (light source, LED part)
2o: light exit plane
3, 101: substrate
3f: counter surface
3h: substrate-fixing hole (through-hole)
3r: rear surface
4: frame
4a: first plate portion
4b: second plate portion
4f: front surface
4h: substrate-fixing hole (through-hole)
4h': frame fixing hole
4r: rear surface
5', 5, 104: screw
5f: screw shaft
5p: screw point
5t: screw head
6, 6', 6": insulating member
6s: front surface (insulating member front surface)
7: light guide plate
7e: end surface
7u: upper surface
8: chassis (chassis)
8': chassis (integrated chassis)
8b, 4a, 4b: plate portion
8h: substrate-fixing hole
9, 10: optical sheet
11: liquid crystal panel
12, 13: liquid crystal display device
14 to 16, 18 to 20, 25: wiring pattern
17, 21, 22: LED-mounting area
23: input
24: output
26: backlight unit
D: distance
W1, W101: width

The invention claimed is:

1. A backlight unit comprising:
a light guide plate for causing light to exit in a planar manner from an upper surface of the light guide plate, the light having entered the light guide plate from a light source;
a substrate provided along an end surface of the light guide plate and having an LED part, as the light source, mounted on a counter surface of the substrate, the counter surface facing the end surface of the light guide plate;
a frame provided along the substrate and attached to the substrate on a rear surface of the substrate, the rear surface being opposite to the counter surface;
one or a plurality of insulating members arranged in such a manner that the one or the plurality of insulating members and the frame sandwich the substrate,
the one or the plurality of insulating members each fixing a screw point of a screw inserted from the frame into a through-hole provided through the frame and the substrate;
a chassis for housing the light guide plate;
wherein the frame is a plate member having an L-shaped cross section, the frame including a first plate portion fixed to the chassis and a second plate portion attached to the substrate, the first and second plate portions being integrally formed; and
wherein the second plate portion is closer to the light guide plate than is the first plate portion.

2. The backlight unit of claim 1, wherein a length of the one or the plurality of insulating members along a direction perpendicular to the counter surface is longer than a length of the LED part along the direction perpendicular to the counter surface.

3. The backlight unit of claim 1, wherein the screw is a metal screw.

4. A liquid crystal display device comprising:
a liquid crystal panel; and
a backlight unit of claim 1, the backlight unit emitting light to a rear surface of the liquid crystal panel.

5. A liquid crystal display device comprising:
a liquid crystal panel; and
a backlight unit of claim 2, the backlight unit emitting light to a rear surface of the liquid crystal panel.

6. A liquid crystal display device comprising:
a liquid crystal panel; and
a backlight unit of claim 3, the backlight unit emitting light to a rear surface of the liquid crystal panel.

7. The liquid crystal display device of claim 4, further comprising an optical sheet provided between the liquid crystal panel and the light guide plate and arranged to be parallel to an upper surface of the light guide plate, wherein:
in a light reception area where the optical sheet receives, from directly below, light having exited from the light guide plate, the optical sheet decreases a luminance by guiding, toward the light guide plate, part of the light received; and
in an area other than the light reception area, the optical sheet increases a luminance by guiding, toward the liquid crystal panel, the light received.

8. The liquid crystal display device of claim 5, further comprising an optical sheet provided between the liquid crystal panel and the light guide plate and arranged to be parallel to an upper surface of the light guide plate, wherein:
in a light reception area where the optical sheet receives, from directly below, light having exited from the light guide plate, the optical sheet decreases a luminance by guiding, toward the light guide plate, part of the light received; and
in an area, other than the light reception area, the optical sheet increases a luminance by guiding, toward the liquid crystal panel, the light received.

9. The liquid crystal display device of claim 6, further comprising an optical sheet provided between the liquid crystal panel and the light guide plate and arranged to be parallel to an upper surface of the light guide plate, wherein:
in a light reception area where the optical sheet receives, from directly below, light having exited from the light guide plate, the optical sheet decreases a luminance by guiding, toward the light guide plate, part of the light received; and in an area other than the light reception area, the optical sheet increases a luminance by guiding, toward the liquid crystal panel, the light received.

* * * * *